May 1, 1928. 1,668,163

K. E. LYMAN

TRANSMISSION

Filed Nov. 24, 1926 4 Sheets-Sheet 1

INVENTOR
KENNETH E. LYMAN
BY
*M. W. McConkey*
ATTORNEY

May 1, 1928.
K. E. LYMAN
TRANSMISSION
Filed Nov. 24, 1926
4 Sheets-Sheet 2
1,668,163
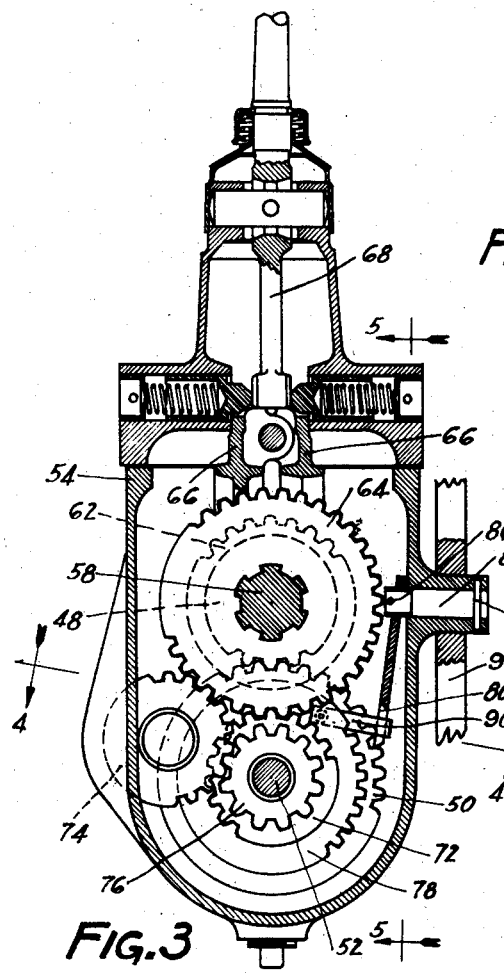
FIG.3
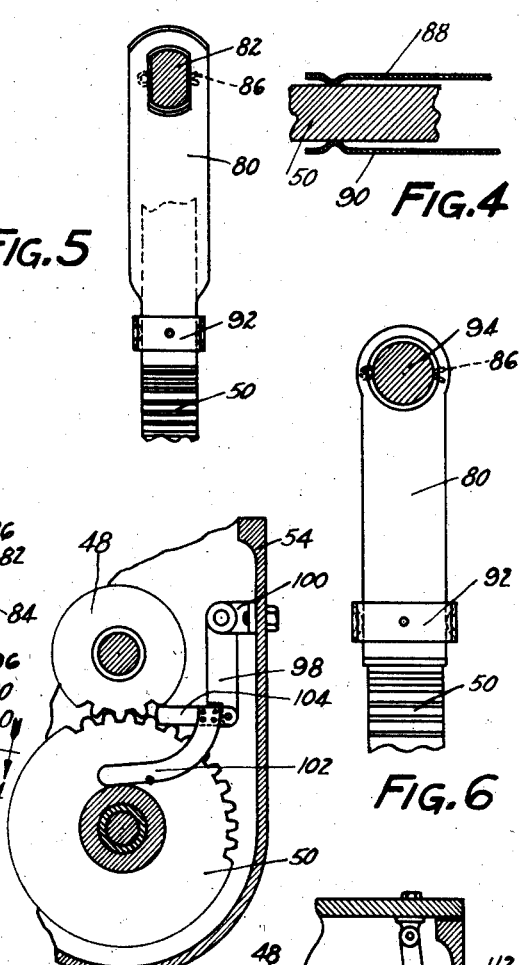
FIG.5
FIG.4
FIG.6
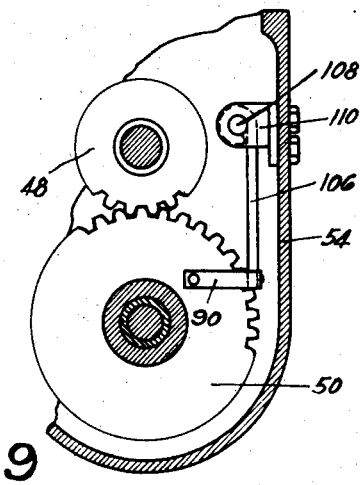
FIG.7
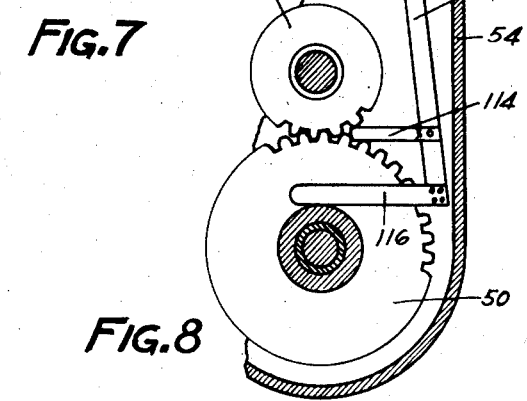
FIG.9
FIG.8
INVENTOR
KENNETH E. LYMAN
BY
ATTORNEY May 1, 1928.

K. E. LYMAN 1,668,163

TRANSMISSION

Filed Nov. 24, 1926    4 Sheets-Sheet 3

INVENTOR
KENNETH E. LYMAN
BY
ATTORNEY

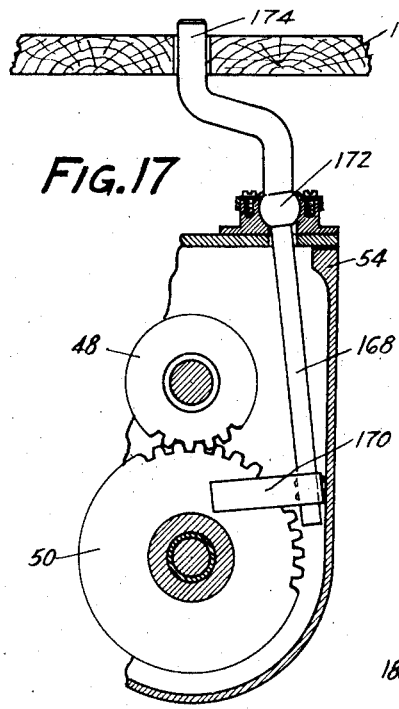
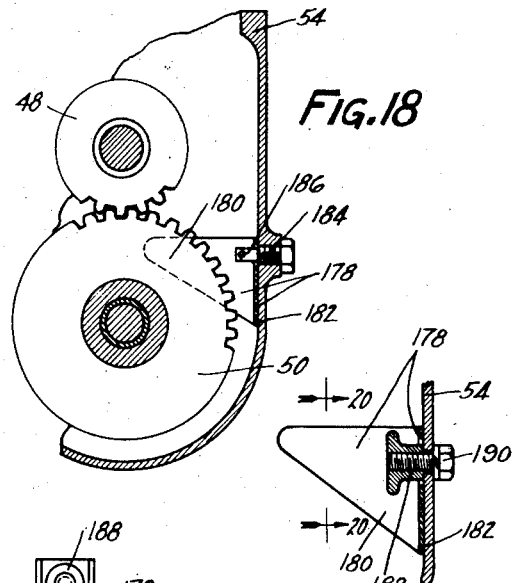
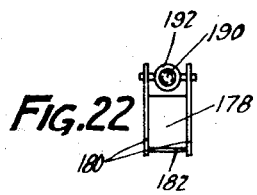
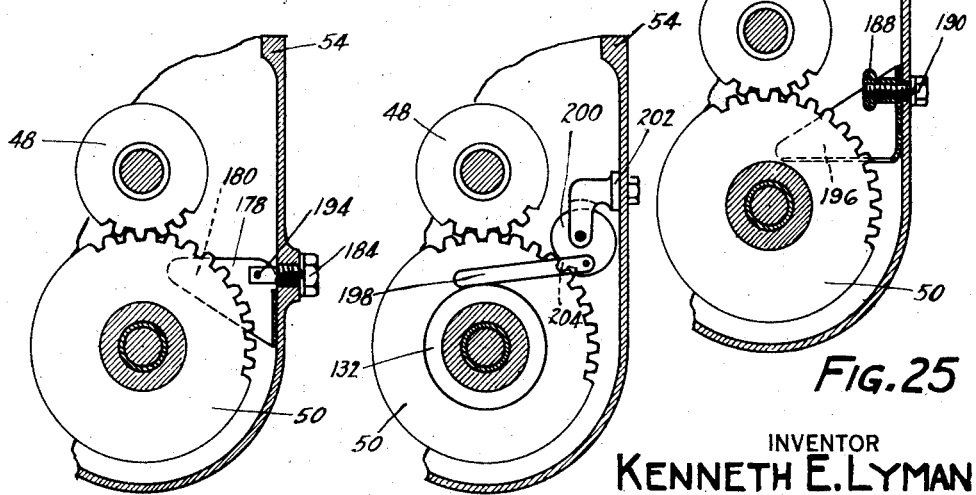

Patented May 1, 1928.

1,668,163

UNITED STATES PATENT OFFICE.

KENNETH E. LYMAN, OF CHICAGO, ILLINOIS, ASSIGNOR TO MOTOR INDUSTRIES, INC., OF CHICAGO, ILLINOIS, A CORPORATION OF ILLINOIS.

TRANSMISSION.

Application filed November 24, 1926. Serial No. 150,513.

This invention relates to transmissions and is illustrated as embodied in a change-speed transmission of the sliding gear type for use in an automobile or other power-driven vehicle. An object of the invention is to provide simple and automatically-operated means for preventing the vehicle from moving in the opposite direction to that desired by the driver,—that is, to prevent the vehicle from moving backward when the gearing is set for a forward motion, and to prevent the vehicle from moving forward when the gearing is set in reverse. One advantage of an arrangement of this sort is that it is unnecessary to hold the vehicle on a grade with the brake when waiting for an opportunity to get through the cross traffic.

One important feature of the invention relates to the provision of a device which acts by engagement with one or more of the teeth of one of the regular change-speed gears, preferably one of the gears on the counter-shaft which turns in the same direction whether the change-speed gearing is set for forward motion or is set in reverse. This permits the use of the device on almost any standard transmission with practically no change in the transmission itself. It also permits a slight movement of the vehicle in the undesired direction before the safety device engages the next tooth of the gear, this movement of a few inches in the wrong direction being preferred in order to guard against locking the transmission when there are very slight movements in the wrong direction, as for example in driving up to the curb in parking hard enough to compress the front tires slightly and force the car a few inches backward when its inertia has been overcome.

Another important feature of novelty, preferably but not necessarily embodied in the invention at the same time that the feature of engagement with the gear teeth is used, is in causing the automatic movement of the safety device to and from a position in which it prevents the rotation of the gear or other rotatable member in the wrong direction, by means of a drag against the rotatable member, as for example by means of a device yieldingly engaging the side or both sides of the gear or other rotatable member so that its drag on that member acts automatically to shift the safety device to and from its rotation-preventing position.

Other features of novelty relate to novel means for manually releasing the safety device when desired, and to particular constructions of the device for preventing rotation of the gear or other member, and to other novel combinations of parts and desirable particular constructions which will be apparent from the following description of a number of desirable embodiments shown in the accompanying drawings, in which:

Figure 3 is a section generally on the line 3—3 of Figure 2 and showing the transmission in transverse vertical section, one form of safety device being shown partly in rear elevation and partly in central section;

Figure 4 is a partial section on the line 4—4 of Figure 3, showing the engagement with the sides of one of the gears of a pair of yielding members which drag against the gear in such a manner as to operate the safety device;

Figure 5 is a partial section on the line 5—5 of Figure 3, showing the safety device and part of one of the gears with which it is engageable;

Figure 6 is a view corresponding to Figure 5 but showing a modified form of safety device;

Figure 7 is a view corresponding to part of Figure 5 and showing a third form of safety device;

Figure 1:
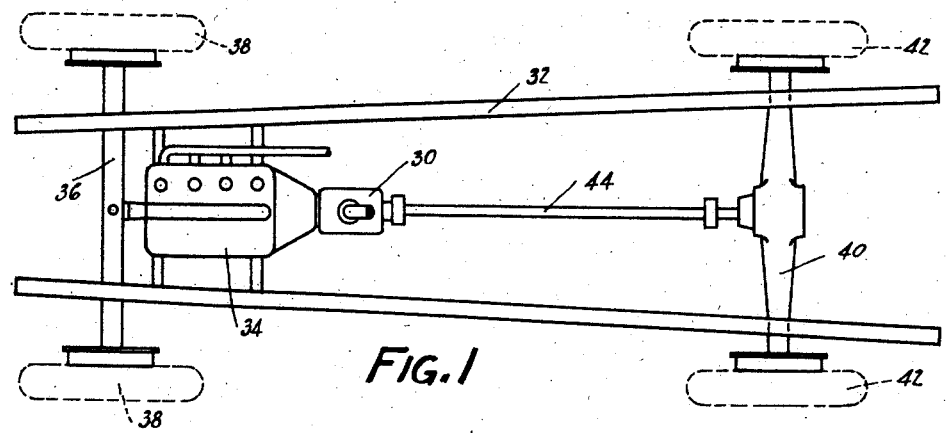
Figure 1 is a diagrammatic top plan view of an automobile chassis showing the relation of the transmission to the other parts of the chassis.
Figure 2:
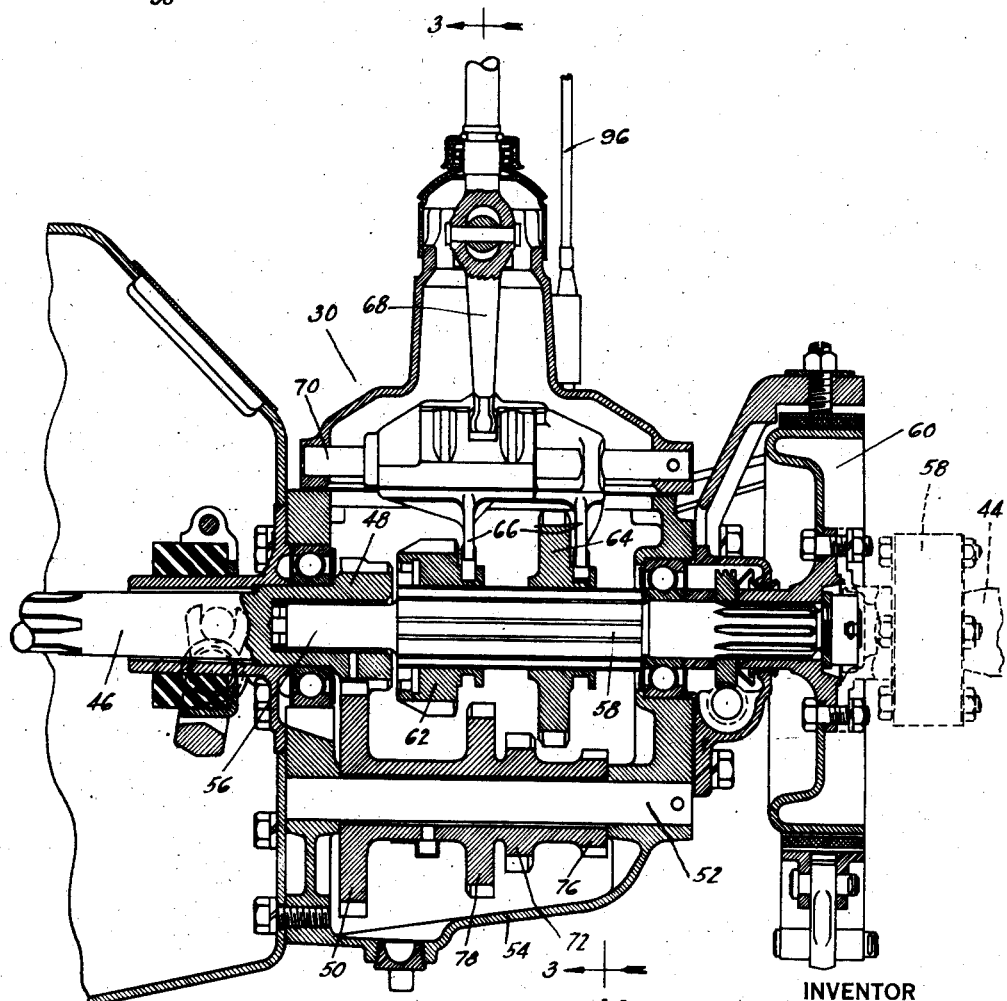
Figure 2 is a longitudinal vertical section through the transmission, showing the change-speed gears.

Figures 8–18 inclusive are respectively views corresponding to Figure 7 and each of which shows a different form of safety device;

Figure 19 is a view corresponding to that part of Figure 18 which shows the safety device, but showing a modified mounting for the safety device;

Figure 20 is a section on the line 20—20 of Figure 19 and showing the modified mounting in elevation;

Figures 21 and 22 are views corresponding respectively to Figures 19 and 20 but showing a third mounting for the safety device; and Figures 23, 24, and 25 are views corresponding to Figure 7 but showing three additional modifications of the safety device.

The invention is illustrated as embodied in a change-speed transmission 30 for an automobile chassis including a frame 32 carrying the engine 34 and supported by a front axle 36 mounted on the road wheels 38 and by a rear axle 40 mounted on the road wheels 42. The road wheels 42 may be driven from engine 34 through the usual clutch and through the transmission 30 operating the usual propeller shaft 44.

The illustrated transmission is of the conventional sliding gear type and includes a driving shaft 46 operated by the clutch and terminating in a gear 48 which is permanently in mesh with a gear 50 forming part of a rotatable gear unit mounted on a countershaft 52 carried by the transmission casing 54. The shaft 46 is formed at its rear end to serve as a bearing for the front end 56 of a splined driven shaft 58 which is rotatably mounted at its rear end in the transmission casing 54 and which is connected to the propeller shaft 44 through any suitable universal joint 58. The transmission brake 60 is also shown at the rear end of the driven shaft 58. Slidingly mounted on the splined driven shaft 58 are a pair of gears 62 and 64 operated by the usual shifter forks 66 which are operated by the universally mounted gear shift lever 68 and which are slidably supported on stationary shafts 70 mounted in the transmission casing 54. The gear 64 can be moved by its shifter fork forwardly into mesh with a gear 72 of the unit driven by the gear 50, to give low or first speed, or rearwardly into mesh with a reverse gear 74 (Figure 3) driven by a gear 76 which forms part of the unit driven by the gear 50, to drive the vehicle in reverse. The gear 62 can be moved rearwardly into mesh with a gear 78 of the unit driven by the gear 50 to give second speed, or forwardly to bring internal teeth on its front face into mesh with the teeth of the gear 48 to give the usual direct drive at high speed.

It will be appreciated that the foregoing description is of one standard type of change-speed gearing ordinarily used as an automobile transmission and that the particular construction of the transmission or change-speed gearing itself forms no part of the present invention, which is applicable to transmissions and change-speed gearing of all kinds.

In the arrangement shown in Figures 3, 4, and 5, the safety device which prevents movement of the vehicle in the wrong direction is in the form of a part 80 which is movable automatically to and from a position in which it engages the teeth of the gear 50. Preferably the part 80 is moved to and from its rotation-preventing position by means which is operated by the rotation of the gear 50 in opposite directions. It will be appreciated that the gear 50 rotates clockwise in Figure 3 so long as the vehicle is moving in the direction desired by the driver whether that movement is forward or backward,—that is, the gear 50 should move clockwise in Figure 3 whether the vehicle is being driven through one of the forward gear positions or through the reverse gear 74. Accordingly, it is sufficient in this arrangement to provide means operated by counter-clockwise movement of gear 50 to shift the safety device 80 into engagement with the teeth of the gear and also operated by movement of gear 50 in its normal or clockwise direction to shift the safety device 80 to a position in which it is ineffective.

In this particular arrangement the device 80 is provided with an opening at its upper end having parallel sides to be movably arranged on a flattened portion of a post 82, stationarily mounted in a hollow boss 84 integrally formed on the side of the casing 54, and projecting inwardly of the casing. Means such as a cotter pin 86 prevents loss of the safety device 80 off the supporting post 82. The fit of the safety device 80 on the post 82 is quite loose so that the device may swing about its upper end as if pivoted. When the device engages the teeth of the gear 50 to prevent its rotation in the undesired direction, the thrust from the gear is taken through the device 80 and post 82 and thus transmitted to the casing 54. In this particular arrangement the shifting of the safety device 80 to and from its rotation-preventing position is accomplished by the drag against the opposite sides of the gear 50 of a pair of spring arms 88 and 90 which preferably are integrally united by a connecting portion 92 spot-welded or riveted or otherwise secured to the bottom of the safety device 80. As shown in Figure 6, the device 80 may if preferred be mounted on a cylindrical post 94 instead of the flattened part 82.

In the particular arrangement shown in Figure 3, the hollow boss 84 is arranged to serve as a fulcrum or mounting for an operating lever 96 which in this instance is the hand brake lever which operates the emergency brake 60.

In the operation of the vehicle it will be seen that the spring arms 88 and 90 constantly drag against the opposite sides of the gear 50 and so long as the gear is turning in its proper direction they swing the lower end of the device 80 away from the gear and ordinarily flat against the side wall of the casing 54. If, however, the vehicle should start to drift backward when waiting at a cross street, or if any other occurrence should cause the gear 50 to start to turn in the wrong direction (in this construction the counter-clockwise direction) the drag of the arms 88 and 90 would swing the safety device 80 away from the casing 54 until its lower end engaged one of the teeth of the gear 50, thus preventing any further rotation of the gear in the wrong direction.

The arrangement shown in Figure 7 differs from that just described in that the safety device is in the form of an angular member 98 pivoted at its upper end on a bracket 100 and operated by spring arms 102 when the gear 50 turns in the wrong direction to bring its end 104 directly between the teeth of the gear 48 and the teeth of the gear 50. While the end 104 wedges so firmly in place as to prevent further rotation of the gears, it is large enough in section to insure that it will not wedge itself between the teeth so that it cannot be released.

In Figure 9, the arrangement is generally the same as in Figure 3, except that the safety device 106 is mounted on a pivot 108 carried by the bracket 110 on the casing 54, instead of merely having a loose fit on the post 82 as in Figure 3.

The modification of Figure 8 is somewhat similar to that of Figure 7, in that the safety device 112 is pivoted at its upper end and has a part 114 which prevents rotation in the wrong direction by being projected between the teeth of gears 48 and 50 by the drag of the spring arms 116 engaging the opposite sides of gear 50.

Figure 10:
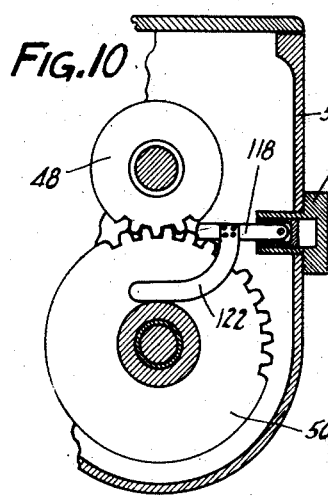
Figure 11:
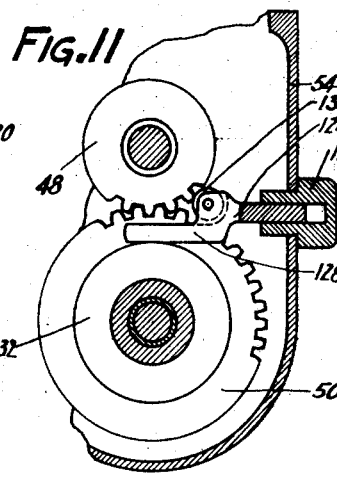
Figure 12:
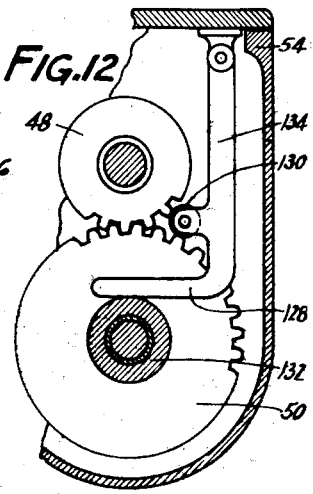

In Figure 10, the safety device is a plunger 118 slidably mounted on a fitting 120 carried by the casing 54 and shifted endwise by spring arms 122 engaging opposite sides of gear 50 to move its left-hand end to and from a rotation-preventing position in which it projects between the teeth of the gears 48 and 50. The arrangement of Figure 11 is generally similar to that of Figure 10 in that it includes a plunger 124 slidably mounted for endwise movement in a fitting 126 carried by the casing 54, but in this instance the spring arms 128 are shown formed integrally with the plunger 124 and the part which is projected between the teeth of the gears 48 and 50 to prevent rotation in one direction is a relatively large roller 130 carried by the plunger 124. The gear 50 is shown with annular shouldered portions 132 serving to support the ends of the spring arms 128. In Figure 12, a pivoted safety device 134 is used to carry the rollers 130 and spring arms 128.

Figure 13:
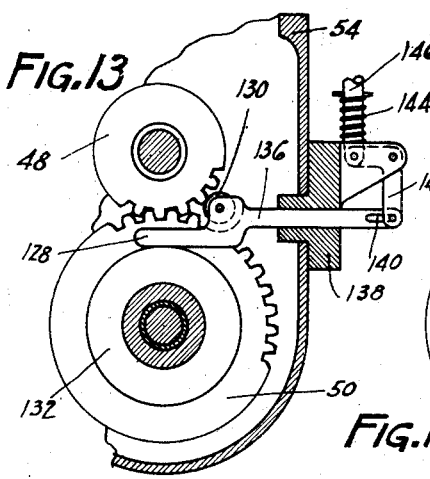

In Figure 13 is shown an arrangement very much like that in Figures 11 and 12 in that the plunger 136 carries the roller 130 and is formed with the spring arms 128 as before, but in this instance the plunger extends entirely through its fitting 138 to the outside of the transmission casing 54. At its outer end the plunger 136 is slotted at 140 to receive a pin on the end of a bell-crank lever 142 which can be operated against the resistance of a return spring 144 by a plunger 146 extending up through the floor board into the driver's compartment of the car. This permits the depression of the plunger 146 to withdraw the safety device and permit the rotation of the gears in the wrong direction when the driver for any reason desires it.

Figure 14:
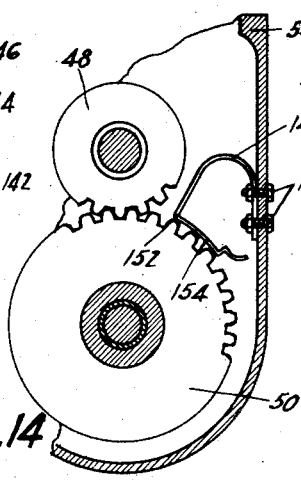
Figure 15:
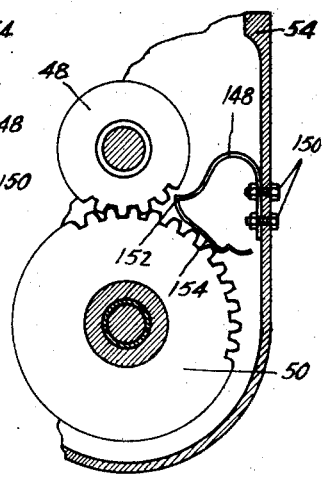

In the arrangement of Figures 14 and 15, the safety device is a leaf spring 148 secured to the casing at 150 and having a sharp part or tooth 152 which is moved by the drag of a part 154 engaging the ends of the teeth of the gear 50.

Figure 16:
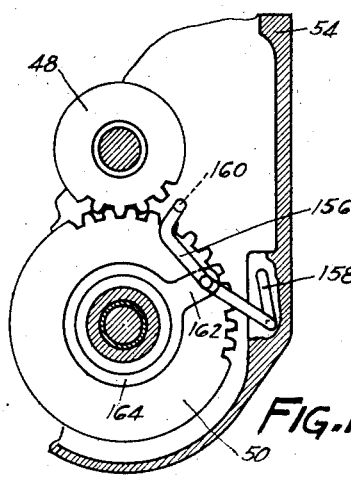

In Figure 16 the safety device is a bell-crank lever 156 having one end turned at right angles and inserted in a cam slot 158 and having the other end 160 also turned at right angles so that it can be swung downwardly and to the left into a rotation-preventing position between the teeth of the gears 48 and 50. The lever 156 is pivoted between its ends on an arm 162 projecting from a disk 164 held in light frictional engagement with one face of the gear 50. So long as the gear 50 is turning in a clockwise direction, the disk 164 is turned as far as possible to swing the lower end of the lever 156 to the bottom of the slot 158, thus withdrawing the end 160 from between the teeth of gears 48 and 50. If, however, the gear 50 should turn in a counter-clockwise direction, the disk 164 would also turn and would carry the lower end of the bell-crank lever 156 to the upper end of the slot 158, which would swing the lever to project the end 160 between the teeth of the gears 48 and 50.

In the arrangement of Figure 17, the safety device is in the form of a long and generally vertical lever 168 carrying the spring arms 170 at its lower end and having this lower end arranged to engage one of the teeth of the gear 50 to prevent its rotation in the wrong direction. The member 168 is mounted by a ball-and-socket joint 172 on the top of the casing 54 and has its upper end 174 projecting through an opening in the floor board 176 into the driver's compartment of the car. It will be seen that the driver can put his heel on the upper end 174 and force it downwardly to withdraw the lower end of the device 168 from the teeth of the gear 50, thus permitting the gear 50 to rotate in the wrong direction when the driver desires it to do so.

In the arrangement of Figure 18, the safety device is a U-shaped stamping 178 having the integral sides 180 serving as the spring arms dragging against the sides of gear 50 and having its lower edge 182 serving as the part which is swung into engagement with one of the teeth of gear 50 to prevent its rotation in the wrong direction. This safety device 178 is formed with a relatively large opening loosely fitting over the end of the stud 184 and retained thereon by means such as a cotter pin 86. In Figure 19, this safety device is mounted on a nut 188 held by a bolt 190 passing through the casing 54. In the arrangement of Figures 21 and 22, the device is held by an ordinary round nut 192 on the bolt 190.

The arrangement of Figure 23 is substantially like that of Figure 18, except that the safety device 178 is mounted on a pivot 194 carried by the stud 184. The form in Figure 25 is substantially like that of Figure 19 except that the inclination of the sides 196 is the opposite of the inclination of the sides 180.

In the arrangement of Figure 24, the spring arms 198 rest on the annular shoulders 132 and are pivoted at their ends to an eccentric 200 mounted on a bracket 202 and provided with one idler tooth 204. When the gear 50 starts to turn the wrong direction the spring arms 198 turn the eccentric 200 first bringing the tooth 204 into mesh, whereupon further rotation of the gear 150 brings the eccentric itself into the space between the next two teeth, thus preventing further rotation of the gear. The eccentric 200 may be regarded as a blank gear or segment of a gear in which only one tooth has been fully formed.

While various modifications of the invention have been described in considerable detail, it is not my intention to limit its scope to those particular embodiments or otherwise than by the terms of the appended claims.

I claim:

1. Transmission mechanism for a vehicle to be driven by an engine and including a gear rotating in the same direction whichever direction the vehicle is moving when driven by the engine, and comprising, in combination therewith, a device arranged to engage a tooth of said gear to prevent its rotation in the opposite direction.

2. Transmission mechanism for a vehicle including a gear, and comprising, in combination therewith, a device arranged to engage a tooth of said gear to prevent its rotation in one direction, and means operated by engagement with the gear for rendering said device inoperative so long as the gear is turning in the opposite direction.

3. A vehicle transmission including change-speed gears, at least one of which normally rotates in the same direction in either direction of vehicle movement, and comprising, in combination therewith, a device engageable with a tooth of said one gear and automatically preventing its rotation in the opposite direction.

4. A vehicle transmission including change-speed gears, and comprising, in combination therewith, a device engageable with a tooth of one of said gears and automatically preventing its rotation in one direction.

5. A vehicle transmission including change-speed gears, and comprising, in combination therewith, a device engageable with a tooth of one of said gears and automatically preventing its rotation in one direction, and means for rendering said device inoperative so long as the gear is turning in the opposite direction.

6. A vehicle transmission including change-speed gears, and comprising, in combination therewith, a device engageable with a tooth of one of said gears and automatically preventing its rotation in one direction, and means operated by engagement with the gear for rendering said device inoperative so long as the gear is turning in the opposite direction.

7. A vehicle transmission including change-speed gears, and comprising, in combination therewith, a device engageable with a tooth of one of said gears and automatically preventing its rotation in one direction, and a resilient part dragging against the gear and arranged to hold the device out of engagement with the gear so long as the gear is turning in the opposite direction.

8. A vehicle transmission including change-speed gears, and comprising, in combination therewith, a device engageable with a tooth of one of said gears and automatically preventing its rotation in one direction, and a resilient part secured to said device and dragging against the gear and arranged to hold the device out of engagement with the gear so long as the gear is turning in the opposite direction.

9. A vehicle transmission including change-speed gears, and comprising, in combination therewith, a device engageable with a tooth of one of said gears and automatically preventing its rotation in one direction, and a resilient part secured to said device and dragging against the gear and arranged to hold the device out of engagement with the gear so long as the gear is turning in the opposite direction and to move the device into engagement with the gear when the gear reverses itself.

10. A vehicle transmission including change-speed gears, and comprising, in combination therewith, a device engageable with a tooth of one of said gears and automatically preventing its rotation in one direction, and a pair of spring members carried by said device and engaging opposite faces of the gear and operated by the drag of the gear to move said device into and out of engagement with the gear teeth according to the direction of rotation of the gear.

11. A transmission comprising, in combination, a gear, a device engageable with the teeth of the gear, and means for automatically moving the device into and out of engagement with the gear teeth to prevent rotation of the gear in one direction.

12. A transmission comprising, in combination, a gear, a device engageable with the teeth of the gear, and means operated by a drag on the gear for automatically moving the device into and out of engagement with the gear teeth to prevent rotation of the gear in one direction.

13. A vehicle transmission comprising, in combination, a rotatable member turning in the same direction in either direction of vehicle movement, and a device engageable with said member to prevent its rotation in the opposite direction and including a part dragging against said member and operated by the drag thereof to hold the device in an ineffective position as long as the member turns in said same direction.

14. A vehicle transmission comprising, in combination, a rotatable member, and a device engageable with said member to prevent its rotation in one direction and including a part dragging against said member and operated by the drag thereof to hold the device in an ineffective position as long as the member turns in the other direction.

15. A transmission comprising, in combination, a rotatable member, a device movable to and from a position in which it prevents rotation of said member, and a part carried by said device and constantly engaging and dragging against said member and operated by the dragging to shift said device to and from rotation-preventing position when said member rotates in opposite directions.

16. A transmission comprising, in combination, a rotatable member, a device movable to and from a position in which it prevents rotation of said member, and spaced yielding parts carried by said device and constantly engaging and dragging against the opposite sides of said member and operated by the dragging to shift said device to and from rotation-preventing position when said member rotates in opposite directions.

17. A transmission comprising, in combination, a casing, change-speed means arranged within the casing and including a rotatable member, a stationary post secured in the wall of said casing and projecting inwardly therefrom, and a device within the casing which is movable into engagement with said member to prevent its rotation and which is arranged to transmit the thrust of said member to the inwardly-projecting post when the rotation is prevented.

18. A transmission comprising, in combination, a casing having a hollow boss in its wall, change-speed means arranged within the casing and including a rotatable member, a stationary post secured in the hollow boss of said casing and projecting inwardly therefrom, and a device within the casing which is movable into engagement with said member to prevent its rotation and which is arranged to transmit the thrust of said member to the inwardly-projecting post when the rotation is prevented, said boss being arranged to have an operating lever pivoted thereon on the outside of the casing.

19. A transmission comprising, in combination, a casing, change-speed gears within the casing, a safety device movable to engage the teeth of one of the gears to prevent its rotation in one direction, and means extending outside the casing for manually withdrawing said device from the gear.

20. A transmission comprising, in combination, a casing, change-speed gears within the casing, a safety device movable automatically into and out of engagement with the teeth of one of the gears when it turns in opposite directions to prevent its rotation in one direction, and means extending outside the casing for manually withdrawing said device from the gear.

21. A transmission comprising, in combination, a pair of intermeshing gears, and a safety device automatically moved by rotation of the gears in opposite directions to and from a position between the teeth of said gears.

22. A transmission comprising, in combination, a pair of intermeshing gears, and a relatively large roller automatically moved by rotation of the gears in opposite directions to and from a position between the teeth of said gears.

23. A transmission comprising, in combination, a pair of intermeshing gears, and a safety device automatically moved by rotation of the gears in opposite directions to and from a position between the teeth of said gears, said safety device being in the form of a spring dragging against one of the gears and moved by the dragging to and from said position.

24. A transmission comprising, in combination, a pair of intermeshing gears, and a safety device automatically moved by rotation of the gears in opposite directions to and from a position between the teeth of said gears, said safety device including a yielding part dragging against one of the gears and to move the device by means of the dragging to and from said position.

25. A transmission comprising, in combination, a casing, change-speed means arranged within the casing and including a rotatable member, a plunger slidably mounted in the wall of the casing for endwise movement to and from a position in which it prevents rotation of said member, and means operated by rotation of said member in opposite directions for shifting said plunger automatically to and from said position.

26. A transmission comprising, in combination, change-speed means including a rotatable member, a device movable to and from a position in which it prevents rotation of said member, and means operated by rotation of said member in opposite directions for shifting said device automatically to and from said position.

In testimony whereof, I have hereunto signed my name.

KENNETH E. LYMAN.